United States Patent
Suelzle et al.

(10) Patent No.: US 12,103,506 B2
(45) Date of Patent: Oct. 1, 2024

(54) METHOD FOR OPERATING A PUMP MOTOR OF A CONTROL DEVICE, CONTROL DEVICE, MOTOR VEHICLE

(71) Applicant: Robert Bosch GmbH, Stuttgart (DE)

(72) Inventors: Helmut Suelzle, Pleidelsheim (DE); Manfred Backes, Oberheinriet (DE)

(73) Assignee: ROBERT BOSCH GMBH, Stuttgart (DE)

( * ) Notice: Subject to any disclaimer, the term of this patent is extended or adjusted under 35 U.S.C. 154(b) by 577 days.

(21) Appl. No.: 17/308,503

(22) Filed: May 5, 2021

(65) Prior Publication Data
US 2022/0017054 A1    Jan. 20, 2022

(30) Foreign Application Priority Data
Jul. 16, 2020  (DE) .......................... 102020203010.3

(51) Int. Cl.
  *B60T 8/17*   (2006.01)
  *B60T 13/66*  (2006.01)
  *H01H 9/54*   (2006.01)

(52) U.S. Cl.
  CPC ........... *B60T 13/662* (2013.01); *H01H 9/548* (2013.01)

(58) Field of Classification Search
  CPC .............................. B60T 13/662; H01H 9/54
  See application file for complete search history.

(56) References Cited

U.S. PATENT DOCUMENTS

| | | | | |
|---|---|---|---|---|
| 7,527,112 B2* | 5/2009 | Aoyagi | ............... | H01M 16/006 180/65.265 |
| 7,557,527 B2* | 7/2009 | Yoshimoto | .............. | H02P 21/16 318/434 |
| 8,726,654 B2* | 5/2014 | Cagnac | ................... | B60T 8/441 60/545 |
| 8,814,279 B2* | 8/2014 | Sekiya | ................... | B60T 8/885 188/106 P |

* cited by examiner

*Primary Examiner* — Gonzalo Laguarda
(74) *Attorney, Agent, or Firm* — NORTON ROSE FULBRIGHT US LLP; Gerard A. Messina

(57) ABSTRACT

A method for operating a pump motor of a control device of a braking system. The control device has the pump motor, a valve device having at least one electrically operable switching valve, a first electric supply connection connectable electrically to the pump motor and a second electric supply connection connectable electrically to the valve device, an electric setpoint operating current being predetermined for the pump motor, and the pump motor being connected electrically to the first supply connection, so that the setpoint operating current is provided at least partially through the first supply connection. It is provided to connect the pump motor electrically to the second supply connection, so that the setpoint operating current is provided at least partially through the second supply connection.

11 Claims, 2 Drawing Sheets

METHOD FOR OPERATING A PUMP MOTOR OF A CONTROL DEVICE, CONTROL DEVICE, MOTOR VEHICLE

CROSS REFERENCE

The present application claims the benefit under 35 U.S.C. § 119 of German Patent Application No. DE 102020203010.3 filed on Jul. 16, 2020, which is expressly incorporated herein by reference in its entirety.

FIELD

The present invention relates to a method for operating a pump motor of a control device of a braking system, the control device having the pump motor, a valve device having at least one electrically operable switching valve, a first electric supply connection connectable electrically to the pump motor and a second electric supply connection connectable electrically to the valve device, an electric setpoint operating current being predetermined for the pump motor, and the pump motor being connected electrically to the first supply connection, so that the setpoint operating current is provided at least partially through the first supply connection.

In addition, the present invention relates to a control device for a braking system, having a control unit.

The present invention also relates to a motor vehicle which has a braking system having such a control device.

BACKGROUND INFORMATION

Control devices of the type mentioned above are conventional. For example, the "Integrated Power Brake" (IPB) of the Applicant is such a control device.

The control device has a pump motor. The pump motor has a rotationally mounted rotor. For example, the rotor is mounted in rotationally fixed manner on a shaft, the shaft being rotationally mounted in a housing of the control device. In addition, the pump motor has an especially polyphase motor winding. For instance, the motor winding is part of a pump-motor stator fixed to the housing, and is distributed around the rotor in such a way that the rotor is rotatable by suitable energizing of the motor winding, that is, the stator winding. The pump motor is designed to actuate pump elements of the control device by rotation of the rotor, that is, the shaft. If the control device is part of a braking system, then by actuation of the pump elements, a hydraulic fluid is delivered into slave cylinders of friction-braking devices of the braking system, so that a deceleration torque is generated by actuation of the pump elements.

In addition, the control device features a valve device having at least one electrically operable switching valve. The switching valve is a solenoid valve, for instance. The valve device preferably has a plurality of electrically operable switching valves. The switching valves are disposed in fluid lines of the control device, so that a through-flow cross-section of the fluid lines may be blocked or cleared by the switching valves in order to control braking processes.

Moreover, the control device has a first electric supply connection that is connectable electrically to the pump motor. Accordingly, electric energy for operating the pump motor may be provided with the aid of the first supply connection. In addition, the control device has a second electric supply connection that is connectable electrically to the valve device. Electric energy for switching the switching valves may therefore be provided with the aid of the second supply connection.

If the pump elements are to be actuated by the pump motor, then an electric setpoint operating current is predetermined for the pump motor. The pump motor is then connected electrically to the first supply connection, so that the setpoint operating current is provided at least partially through the first supply connection. According to conventional methods for operating the pump motor, the setpoint operating current is provided entirely, that is to say, solely through the first supply connection.

SUMMARY

A method according to an example embodiment of the present invention provides that the pump motor is connected electrically to the second supply connection, so that the setpoint operating current is provided at least partially through the second supply connection. The setpoint operating current is thus provided partly through the first supply connection and partly through the second supply connection. If the control device is part of a braking system of a motor vehicle, then the first supply connection is connected electrically with the aid of a first electric supply line to a voltage source of the motor vehicle. The second supply connection is connected electrically to a voltage source of the motor vehicle with the aid of a second electric supply line. Because, according to the invention, the setpoint operating current is provided at least partially via the second supply connection, a lower electric current flows through the first supply line compared with conventional methods, thereby reducing the thermal load of the first supply line. As a result, the first supply line may be made thinner and therefore at lower cost.

According to one preferred specific embodiment of the present invention, the pump motor is connected electrically to the second supply connection only when the setpoint operating current exceeds a predetermined current threshold value. It is assumed that the thermal load of the first supply line is acceptable when the setpoint operating current is less than the current threshold value. Accordingly, it is then not necessary to provide the setpoint operating current partially through the second supply connection. If only the first supply connection is used to provide the setpoint operating current, then the setpoint operating current is able to be provided more easily from the standpoint of process engineering.

Preferably, the first supply connection is disconnected electrically from the pump motor when the second supply connection is connected electrically to the pump motor. Thus, a switch is made from the first supply connection to the second supply connection. Correspondingly, the second supply connection is preferably disconnected electrically from the pump motor when the first supply connection is connected electrically to the pump motor. A switch is thus made from the second supply connection to the first supply connection. Because only one of the supply connections is connected electrically to the pump motor at any one time, in each instance the setpoint operating current is supplied at a specific point in time through only one of the supply connections. However, if a sufficiently long period of time is considered, then because of the switchover between the supply connections, each supply connection makes the setpoint operating current available proportionally.

According to one preferred specific embodiment of the present invention, the control device features a switching device that has a first semiconductor switch and a second semiconductor switch, the first and the second semiconductor switches being disposed in a first electric line by which the pump motor is connected/connectable to the first supply connection, the first semiconductor switch being assigned a first diode blocking in the flow direction of the operating current, the second semiconductor switch being assigned a second diode conductive in the flow direction of the operating current, and only the first semiconductor switch being switched to the non-conductive state in order to disconnect the first supply connection from the pump motor. Thus, only the first semiconductor switch is switched to the non-conductive state when the second supply connection is connected electrically to the pump motor. The switching device designed as described above permits, first of all, reliable connection and disconnection of the first supply connection and the pump motor. Because only the first semiconductor switch is switched to the non-conductive state, a supply gap with regard to the provision of the operating current is avoided when switching from the first supply connection to the second supply connection.

According to one preferred specific embodiment of the present invention, the switching device has a third semiconductor switch and a fourth semiconductor switch, the third and the fourth semiconductor switches being disposed in a second electric line by which the pump motor is connected/connectable electrically to the second supply connection, the third semiconductor switch being assigned a third diode blocking in the flow direction of the operating current, the fourth semiconductor switch being assigned a fourth diode conductive in the flow direction of the operating current, and only the third semiconductor switch being switched to the non-conductive state in order to disconnect the second supply connection from the pump motor. Thus, only the third semiconductor switch is switched to the non-conductive state when the first supply connection is connected electrically to the pump motor. The switching device designed as described above permits, first of all, reliable connection and disconnection of the second supply connection and the pump motor. Because only the third semiconductor switch is switched to the non-conductive state, a supply gap with regard to the provision of the operating current is avoided when switching from the second supply connection to the first supply connection.

Preferably, a portion of the setpoint operating current is provided through the first supply connection, the portion differing from a portion of the setpoint operating current provided through the second supply connection. To that end, preferably the first semiconductor switch is driven with a different duty factor than the third semiconductor switch. Alternatively, a portion of the setpoint operating current is provided through the first supply connection, said portion corresponding to the portion of the setpoint operating current provided through the second supply connection.

The control device according to an example embodiment of the present invention for a braking system has a pump motor, a valve device having at least one electrically operable switching valve, a first electric supply connection connectable electrically to the pump motor, a second electric supply connection connectable electrically to the valve device, and a switching device having a plurality of switches, is characterized by a control unit that is adapted especially in order, by driving the switching device, to carry out the method of the present invention. The advantages already cited are obtained from this, as well. Further preferred features and feature combinations are derived from the description herein. The control device preferably has a housing, the pump motor, the valve device, the first supply connection, the second supply connection and the switching device being fixed to the control-device housing. The elements of the control device are then easily manipulable together as a combined module.

According to one preferred specific embodiment of the present invention, the switching device has a first electric line, by which the first supply connection and the pump motor are connected/connectable electrically, the first line having a first semiconductor switch and a second semiconductor switch, the first semiconductor switch being assigned a first diode blocking in the flow direction of the operating current, and the second semiconductor switch being assigned a second diode conductive in the flow direction of the operating current. As described above, by using a switching device designed in such a way, supply gaps with respect to the provision of the operating current may advantageously be avoided when switching over from the first supply connection to the second supply connection.

According to one preferred specific embodiment of the present invention, the switching device has a second electric line, by which the second supply connection and the pump motor are connected/connectable electrically, the second line having a third semiconductor switch and a fourth semiconductor switch, the third semiconductor switch being assigned a third diode blocking in the flow direction of the operating current, and the fourth semiconductor switch being assigned a fourth diode conductive in the flow direction of the operating current. As described above, by using a switching device designed in such a way, supply gaps with respect to the provision of the operating current may advantageously be avoided when switching over from the second supply connection to the first supply connection.

Preferably, the second line is connected to the first line at a point between the first and the second semiconductor switches on one side and the pump motor on the other side. The second line is thus connected electrically to the pump motor with the aid of the first line. A technically simple linkup of the pump motor both with the first supply connection and with the second supply connection is thereby attained.

According to one preferred specific embodiment of the present invention, the switching device has a third electric line, by which the second supply connection and the valve device are connected/connectable electrically, the third line having a fifth semiconductor switch. Accordingly, the electric connection between the second supply connection and the valve device may also either be established or interrupted by the switching device.

Preferably, the second line is connected to the third line at a point between the fifth semiconductor switch on one side and the valve device on the other side. The second line is thus connected electrically to the second supply connection with the aid of the third line. A technically simple linkup of the second line with the second supply connection is thereby attained.

The control device preferably has a first capacitor which is connected electrically to the first line at a point between the first semiconductor switch and the second semiconductor switch on one side and the first supply connection on the other side. A load of a voltage source connected electrically to the first supply connection is thereby reduced when carrying out the method for operating the pump motor.

The control device preferably has a second capacitor which is connected electrically to the second line at a point between the fifth semiconductor switch on one side and the second supply connection on the other side. A load of a voltage source connected electrically to the second supply connection is thereby reduced when carrying out the method for operating the pump motor.

A motor vehicle in accordance with an example embodiment of the present invention features a braking system having the control device according to an example embodiment of the present invention, the first and the second supply connections being connected electrically to the same voltage source of the motor vehicle, or the first supply connection being connected electrically to a different voltage source of the motor vehicle than the second supply connection. The advantages already mentioned above are obtained from this, as well. Further preferred features and feature combinations are derived from the description herein.

Below, the present invention is explained in greater detail with the aid of the figures.

DETAILED DESCRIPTION OF EXAMPLE EMBODIMENTS

Figure 1:
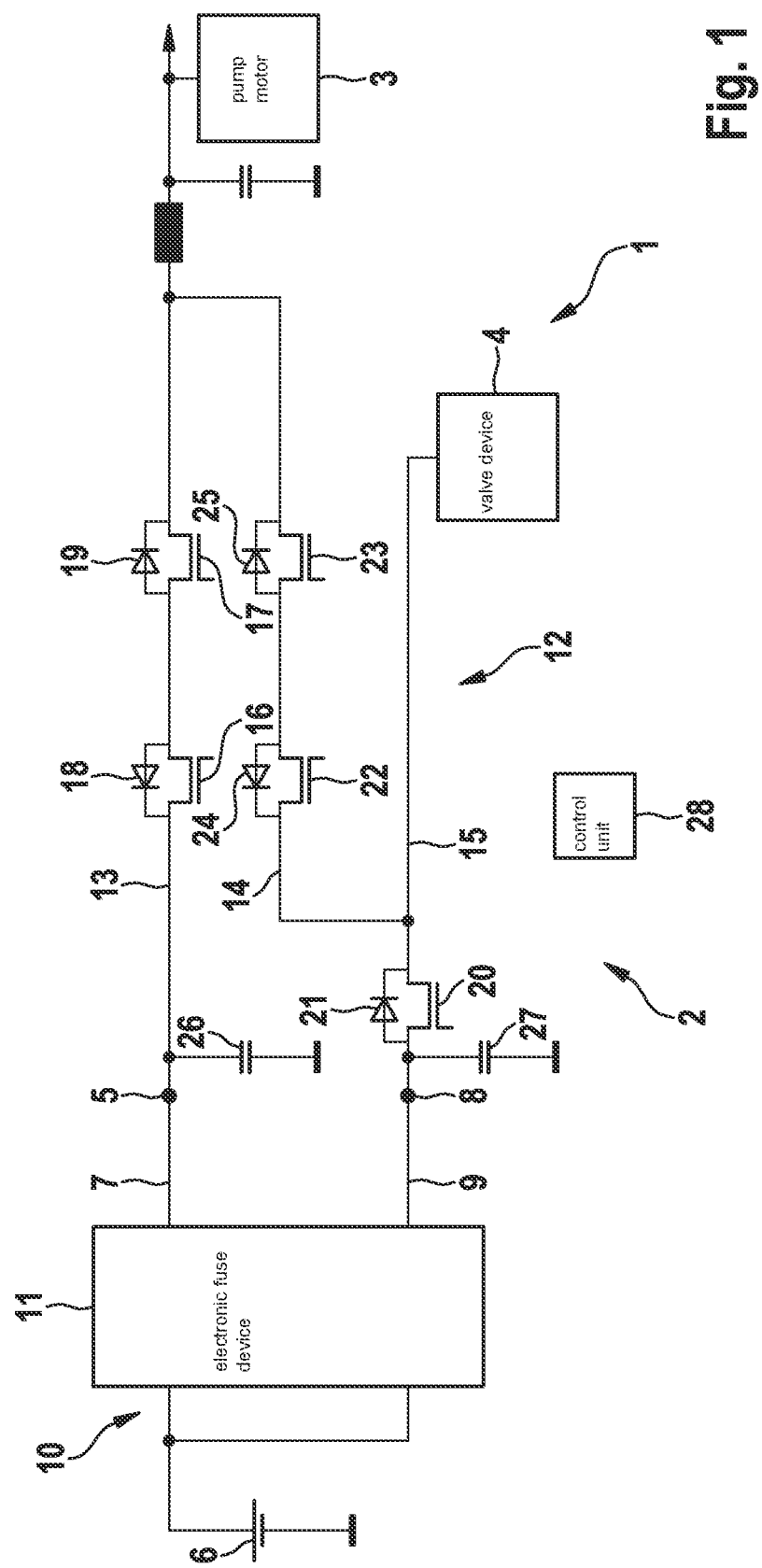
FIG. 1 shows a control device of a braking system in accordance with an example embodiment of the present invention.

FIG. 1 shows a control device 1 in a schematic representation. Control device 1 is part of a braking system of a motor vehicle 2.

Control device 1 has a pump motor 3, which is represented in simplified fashion in FIG. 1. Pump motor 3 has a rotor that is mounted in rotationally fixed manner on a shaft, the shaft being rotationally mounted in a housing of control device 1. In addition, pump motor 3 has a stator which is fixed to the housing and has a polyphase stator winding that is distributed around the rotor in such a way that the rotor is rotatable by suitable energizing of the stator winding. Pump motor 3 is designed to actuate the pump elements of control device 1 by rotation of the rotor, that is, the shaft. By actuating the pump elements, a hydraulic fluid is delivered into slave cylinders of friction-braking devices of the braking system, so that a friction-braking torque is generated by actuation of the pump elements.

In addition, control device 1 has a valve device 4. Valve device 4 is also only represented in simplified fashion in FIG. 1. Valve device 4 has a plurality of electrically operable switching valves, which are disposed in fluid lines of control device 1. In order to control braking processes, through-flow cross-sections of the fluid lines may be either blocked or cleared by actuation of the switching valves.

Control device 1 also has a first electric supply connection 5. First supply connection 5 is connected electrically to a voltage source 6 of the motor vehicle. To that end, a first electric supply line 7 is provided, which is connected to first supply connection 5 on one side and to voltage source 6 on the other side.

In addition, control device 1 has a second electric supply connection 8. Second supply connection 8 is also connected electrically to voltage source 6. To that end, a second electric supply line 9 is provided, which is connected electrically to second supply connection 8 on one side and to first supply line 7 on the other side.

Supply lines 7 and 9 are part of a wiring harness 10 of the motor vehicle. An electronic fuse device 11 is assigned to supply lines 7 and 9. Fuse device 11 is designed to block a flow of electric current through first supply line 7 and/or second supply line 9 in the event of a short circuit.

In the present case, voltage source 6 is an electrical system battery 6 of the motor vehicle. According to a further exemplary embodiment, supply connections 5 and 8 are connected electrically to different voltage sources of the motor vehicle. For example, first supply line 7 is then connected to first supply connection 5 on one side and to a first voltage source on the other side, and second supply line 9 is connected to second supply connection 8 on one side and to a second voltage source on the other side.

In addition, control device 1 has a switching device 12. Switching device 12 has a first electric line 13, a second electric line 14 and a third electric line 15.

First line 13 is connected to first supply connection 5 on one side and to pump motor 3 on the other side. A first semiconductor switch 16 and a second semiconductor switch 17 of switching device 12 are disposed in first line 13, first semiconductor switch 16 being located between first supply connection 5 and second semiconductor switch 17. If semiconductor switches 16 and 17 are in the conductive state, then an electric operating current flowing through first line 13 is made available via first supply connection 5 in order to operate pump motor 3. With respect to the flow direction of the operating current flowing through first line 13, it is assumed that the operating current flows from first supply connection 5 to pump motor 3. First semiconductor switch 16 is assigned a first diode 18 which is blocking in the flow direction of the operating current. Second semiconductor switch 17 is assigned a second diode 19 which is conductive in the flow direction of the operating current. Accordingly, second semiconductor switch 17 is a polarity reversal protection switch 17.

Third line 15 is connected to second supply connection 8 on one side and to valve device 4 on the other side. A fifth semiconductor switch 20 of switching device 12 is disposed in third line 15. If fifth semiconductor switch 20 is in the conductive state, then an electric valve-operating current flowing through third line 15 is provided via second supply connection 8 in order to operate valve device 4. With respect to the flow direction of the valve-operating current flowing through third line 15, it is assumed that the valve-operating current flows from second supply connection 8 to valve device 4. Fifth semiconductor switch 20 is assigned a fifth diode 21 which is conductive in the flow direction of the valve-operating current.

Second line 14 is connected electrically to first line 13 at a point between second semiconductor switch 17 on one side and pump motor 3 on the other side. In addition, second line 14 is connected electrically to third line 15 at a point between fifth semiconductor switch 20 on one side and valve device 4 on the other side. A third semiconductor switch 22 and a fourth semiconductor switch 23 of switching device 12 are disposed in second line 14, third semiconductor switch 22 being located between third line 15 on one side and fourth semiconductor switch 23 on the other side. If fifth semiconductor switch 20, third semiconductor switch 22 and fourth semiconductor switch 23 are in the conductive state, then an electric operating current flowing through second line 14 is provided via second supply connection 8 in order to operate pump motor 3. With respect to the flow direction of the operating current flowing through second line 14, it is assumed that the operating current flows from second supply connection 8 to pump motor 3. Third semiconductor switch 22 is assigned a third diode 24, which is blocking in the flow direction of the operating current flowing through second line 14. Fourth semiconductor switch 23 is assigned a fourth diode 25, which is conductive in the flow direction of the operating current flowing through second line 14. Accordingly, fourth semiconductor switch 23 is a polarity reversal protection switch 23.

In addition, control device 1 has a first capacitor 26, which is connected electrically to first line 13 at a point between first semiconductor switch 16 on one side and first supply connection 5 on the other side.

Control device 1 also has a second capacitor 27, which is connected electrically to third line 15 at a point between fifth semiconductor switch 20 on one side and second supply connection 8 on the other side.

In addition, control device 1 has a control unit 28 which is connected to semiconductor switches 16, 17, 20, 22 and 23 in terms of signal engineering, and is designed to actuate semiconductor switches 16, 17, 20, 22 and 23.

Figure 2:
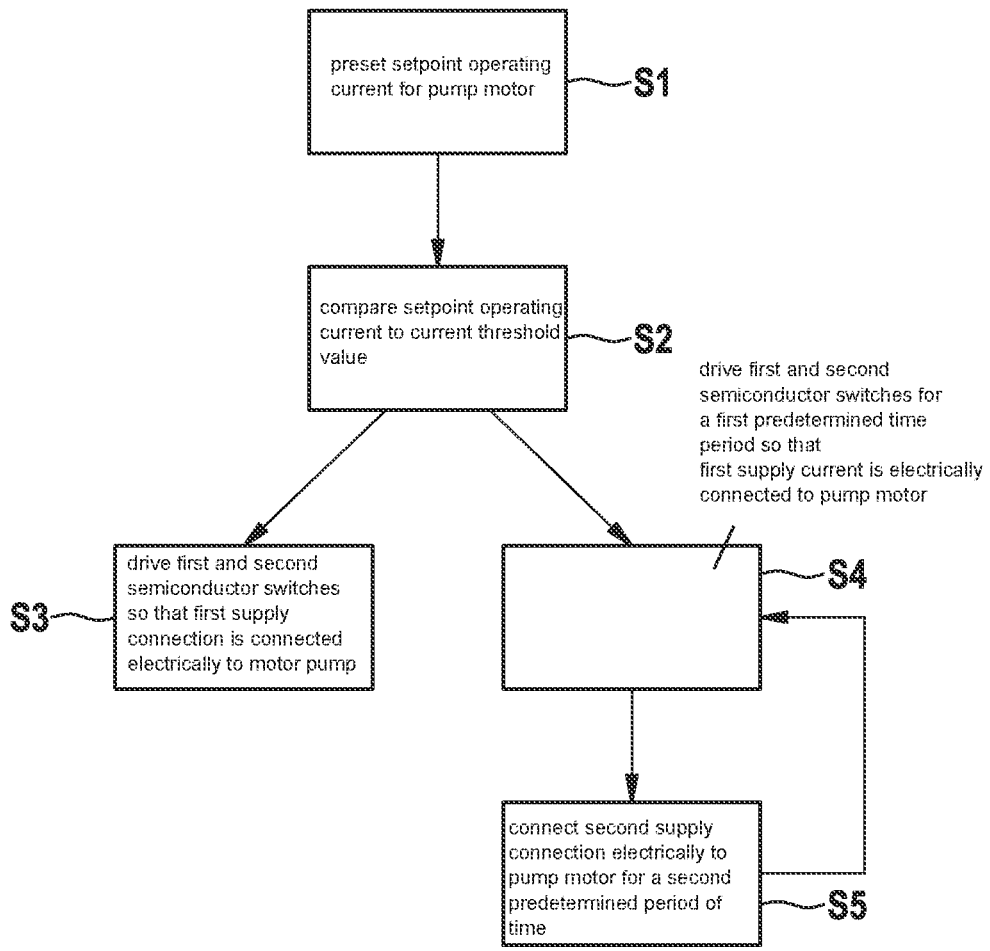
FIG. 2 shows a method for operating a pump motor of the control device, in accordance with an example embodiment of the present invention.

Below, one advantageous method for operating pump motor 3 is explained in greater detail with reference to FIG. 2. For this purpose, FIG. 2 shows the method in light of a flowchart.

In a first step S1, control unit 28 presets a setpoint operating current for pump motor 3. The intention is to apply the setpoint operating current to the stator winding of pump motor 3. As a result, pump motor 3 is operated, and consequently a braking procedure is carried out.

In a second step S2, control unit 28 compares the setpoint operating current to a current threshold value.

If the setpoint operating current is less than the current threshold value, then reference is made to a third step S3. In third step S3, control unit 28 then drives first semiconductor switch 16 and second semiconductor switch 17, so that first supply connection 5 is connected electrically to pump motor 3. As a result, the operating current for operating pump motor 3 is made available through first supply connection 5. In step S3, preferably at least one of semiconductor switches 16 and 17 is driven in clocked fashion, in order to adjust the level of the current flowing through first line 13 to the level of the setpoint operating current.

If the setpoint operating current is greater than the current threshold value, then reference is made to a fourth step S4. In fourth step S4, control unit 28 then drives first semiconductor switch 16 and second semiconductor switch 17 for a predetermined first period of time in such a way that first supply connection 5 is connected electrically to pump motor 3. As a result, during the first period of time, the operating current for operating pump motor 3 is made available via first supply connection 5. In step S4, preferably at least one of semiconductor switches 16 and 17 is also driven in clocked fashion, in order to adjust the level of the current flowing through first line 13 to the level of the setpoint operating current. With the expiration of the first period of time, at least first semiconductor switch 16 is switched to the non-conductive state. First supply connection 5 is thus disconnected electrically from pump motor 3. Second semiconductor switch 17 preferably remains conductive, even after the first period of time has elapsed.

In a fifth step S5, which immediately follows fourth step S4, control unit 28 connects second supply connection 8 electrically to pump motor 3 for a second predetermined period of time by switching fifth semiconductor switch 20, third semiconductor switch 22 and fourth semiconductor switch 23 to the conductive state. Immediately after first supply connection 5 and pump motor 3 have been disconnected electrically from each other, second supply connection 8 and pump motor 3 thus become electrically connected. Consequently, during the second period of time, the operating current is made available via second supply connection 8. Preferably at least one of semiconductor switches 20, 22 and 23 is driven in clocked fashion in fifth step S5, as well, in order to adjust the level of the current flowing through second line 14 to the level of the setpoint operating current. With the expiration of the second period of time, at least third semiconductor switch 22 is switched to the non-conductive state, and reference is made back to fourth step S4. With the expiration of the second period of time, second supply connection 8 is thus disconnected electrically from pump motor 3. Fourth semiconductor switch 23 preferably remains conductive, even after the second period of time has elapsed.

Thus, if the setpoint operating current is greater than the current threshold value, then supply connections 5 and 8 are connected electrically in turns to pump motor 3, that is, to the stator winding of pump motor 3. Correspondingly, the setpoint operating current is made available in turns through first supply connection 5 and second supply connection 8, so that the setpoint operating current is provided partly through each supply connection 5 and 8.

What is claimed is:

1. A method for operating a pump motor of a control device of a braking system, the control device including the pump motor, a valve device having at least one electrically operable switching valve, a first electric supply connection connectable electrically to the pump motor, and a second electric supply connection connectable electrically to the valve device, an electric setpoint operating current being predetermined for the pump motor, the method comprising:

electrically connecting the pump motor alternatingly to the first supply connection and the second supply connection, including performing the following steps a plurality of times in immediate succession:
a) electrically connecting the pump motor to the first supply connection for a predetermined first period of time, so that the setpoint operating current is provided at least partially through the first supply connection, wherein, during the predetermined first period of time, the pump motor is electrically disconnected from the second supply connection while the pump motor is electrically connected to the first supply connection; and
b) immediately after expiration of the predetermined first period of time, electrically disconnecting the pump motor from the first supply connection and electrically connecting the pump motor to the second supply connection for a predetermined second period of time so that the setpoint operating current is provided at least partially through the second supply connection, wherein the pump motor is electrically disconnected from the first supply connecting during the predetermined second period of time, and wherein immediately after expiration of the predetermined second period of time, the pump motor is electrically disconnected from the second supply connection;

wherein the control device has a switching device that has a first electric line, by which the first supply connection and the pump motor are connectable electrically, the first line having a first semiconductor switch and a second semiconductor switch, the first semiconductor switch being assigned a first diode blocking in a flow direction of the operating current, and the second semiconductor switch being assigned a second diode conductive in the flow direction of the operating current;

wherein the switching device has a second electric line, by which the second supply connection and the pump motor are connectable electrically, the second line having a third semiconductor switch and a fourth semiconductor switch, the third semiconductor switch being assigned a third diode blocking in the flow direction of the operating current, and the fourth semiconductor switch being assigned a fourth diode conductive in the flow direction of the operating current; and wherein the second line is connected to the first line at a point between the first and the second semiconductor switches on one side and the pump motor on another other side.

2. The method as recited in claim 1, wherein a portion of the setpoint operating current is provided through the first supply connection, the portion differing from a portion of the setpoint operating current provided through the second supply connection.

3. The method as recited in claim 1, wherein the method further comprises:
in step a), during the predefined first period of time, adjusting a level of current flowing through the first line to a level of the electrical setpoint operating current by driving at least one of the first semiconductor switch and the second semiconductor switch in clocked fashion.

4. The method as recited in claim 3, wherein the method comprising:
in step b), during the predetermined second period of time, adjusting a level of current flowing through the second line to the level of the electrical setpoint operating current by driving at least one of the third semiconductor switch and the fourth semiconductor switch in clocked fashion.

5. A control device for a braking system, the control device comprising:
a pump motor;
a valve device having at least one electrically operable switching valve;
a first electric supply connection connectable electrically to the pump motor;
a second electric supply connection connectable electrically to the valve device and connectable electrically to the pump motor;
a switching device having a plurality of switches; and
a control unit configured to, by driving the switching device:
electrically connect the pump motor alternatingly to the first supply connection and the second supply connection, including performing the following a plurality of times in immediate succession:
a) electrically connecting the pump motor to the first supply connection for a first predetermined period of time, so that a setpoint operating current is provided at least partially through the first supply connection, wherein, during the predetermined first period of time, the pump motor is electrically disconnected from the second supply connection while the pump motor electrically connected to the first supply connection, and
b) immediately after expiration of the predetermined first period of time, electrically disconnecting the pump motor from the first supply connection and electrically connecting the pump motor to the second supply connection for a second predetermined period of time so that the setpoint operating current is provided at least partially through the second supply connection, wherein the pump motor is electrically disconnected from the first supply connecting during the predetermined second period of time, and wherein immediately after expiration of the predetermined second period of time, the pump motor is electrically disconnected from the second supply connection;

wherein the switching device has a first electric line, by which the first supply connection and the pump motor are connectable electrically, the first line having a first semiconductor switch and a second semiconductor switch, the first semiconductor switch being assigned a first diode blocking in a flow direction of the operating current, and the second semiconductor switch being assigned a second diode conductive in the flow direction of the operating current;

wherein the switching device has a second electric line, by which the second supply connection and the pump motor are connectable electrically, the second line having a third semiconductor switch and a fourth semiconductor switch, the third semiconductor switch being assigned a third diode blocking in the flow direction of the operating current, and the fourth semiconductor switch being assigned a fourth diode conductive in the flow direction of the operating current; and wherein the second line is connected to the first line at a point between the first and the second semiconductor switches on one side and the pump motor on another other side.

6. A control device for a braking system, the control device comprising:
a pump motor;
a valve device having at least one electrically operable switching valve;
a first electric supply connection connectable electrically to the pump motor;
a second electric supply connection connectable electrically to the valve device and connectable electrically to the pump motor;
a switching device having a plurality of switches; and
a control unit configured to, by driving the switching device:
electrically connect the pump motor alternatingly to the first supply connection and the second supply connection, including performing the following a plurality of times in immediate succession:
a) electrically connecting the pump motor to the first supply connection for a first predetermined period of time, so that a setpoint operating current is provided at least partially through the first supply connection, wherein, during the predetermined first period of time, the pump motor is electrically disconnected from the second supply connection while the pump motor electrically connected to the first supply connection, and
b) immediately after expiration of the predetermined first period of time, electrically disconnecting the pump motor from the first supply connection and electrically connecting the pump motor to the second supply connection for a second predetermined period of time so that the setpoint operating current is provided at least partially through the second supply connection, wherein the pump motor is electrically disconnected from the first supply connecting during the predetermined second period of time, and wherein immediately after expiration of the predetermined second period of time, the pump motor is electrically disconnected from the second supply connection;

wherein the switching device has a first electric line, by which the first supply connection and the pump motor are connectable electrically, the first line having a first semiconductor switch and a second semiconductor switch, the first semiconductor switch being assigned a first diode blocking in a flow direction of the operating current, and the second semiconductor switch being assigned a second diode conductive in the flow direction of the operating current;

wherein the switching device has a second electric line, by which the second supply connection and the pump motor are connectable electrically, the second line having a third semiconductor switch and a fourth semiconductor switch, the third semiconductor switch being assigned a third diode blocking in the flow direction of the operating current, and the fourth semiconductor switch being assigned a fourth diode conductive in the flow direction of the operating current; and wherein the switching device has a third electric line, by which the second supply connection and the valve device are connectable electrically, the third line having a fifth semiconductor switch.

7. The control device as recited in claim 6, wherein the second line is connected to the third line at a point between the fifth semiconductor switch on one side and the valve device on another other side.

8. The control device as recited in claim 6, further comprising:
a second capacitor that is connected electrically to the third line at a point between the fifth semiconductor switch on one side and the second supply connection on another the other side.

9. A control device for a braking system, the control device comprising:
a pump motor;
a valve device having at least one electrically operable switching valve;
a first electric supply connection connectable electrically to the pump motor;
a second electric supply connection connectable electrically to the valve device and connectable electrically to the pump motor;
a switching device having a plurality of switches; and
a control unit configured to, by driving the switching device:
electrically connect the pump motor alternatingly to the first supply connection and the second supply connection, including performing the following a plurality of times in immediate succession:
a) electrically connecting the pump motor to the first supply connection for a first predetermined period of time, so that a setpoint operating current is provided at least partially through the first supply connection, wherein, during the predetermined first period of time, the pump motor is electrically disconnected from the second supply connection while the pump motor electrically connected to the first supply connection, and
b) immediately after expiration of the predetermined first period of time, electrically disconnecting the pump motor from the first supply connection and electrically connecting the pump motor to the second supply connection for a second predetermined period of time so that the setpoint operating current is provided at least partially through the second supply connection, wherein the pump motor is electrically disconnected from the first supply connecting during the predetermined second period of time, and wherein immediately after expiration of the predetermined second period of time, the pump motor is electrically disconnected from the second supply connection;

wherein the switching device has a first electric line, by which the first supply connection and the pump motor are connectable electrically, the first line having a first semiconductor switch and a second semiconductor switch, the first semiconductor switch being assigned a first diode blocking in a flow direction of the operating current, and the second semiconductor switch being assigned a second diode conductive in the flow direction of the operating current; and wherein the control device further comprise a first capacitor that is connected electrically to the first line at a point between the first semiconductor switch and the second semiconductor switch on one side and the first supply connection on another other side.

10. The control device as recited in claim 9, wherein the switching device has a second electric line, by which the second supply connection and the pump motor are connectable electrically, the second line having a third semiconductor switch and a fourth semiconductor switch, the third semiconductor switch being assigned a third diode blocking in the flow direction of the operating current, and the fourth semiconductor switch being assigned a fourth diode conductive in the flow direction of the operating current.

11. The control device as recited in claim 10, wherein the second line is connected to the first line at a point between the first and the second semiconductor switches on one side and the pump motor on another other side.

* * * * *